United States Patent
Manson et al.

(10) Patent No.: US 9,967,135 B2
(45) Date of Patent: May 8, 2018

(54) COMMUNICATION LINK MONITORING AND FAILOVER

(71) Applicant: Schweitzer Engineering Laboratories, Inc., Pullman, WA (US)

(72) Inventors: Scott M. Manson, Moscow, ID (US); Brian R. Clark, Pullman, WA (US); Angelo D'Aversa, Ambler, PA (US); Sreenivas Dingari, Devon, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days. days.

(21) Appl. No.: 15/084,089

(22) Filed: Mar. 29, 2016

(65) Prior Publication Data

US 2017/0288950 A1  Oct. 5, 2017

(51) Int. Cl.
*H04L 12/24* (2006.01)
*H04L 12/707* (2013.01)
*H04L 12/26* (2006.01)

(52) U.S. Cl.
CPC ...... *H04L 41/0668* (2013.01); *H04L 43/0811* (2013.01); *H04L 43/0817* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 3,781,706 A | 12/1973 | Osborne | |
| 4,535,306 A | 8/1985 | Yamaguchi | |

(Continued)

FOREIGN PATENT DOCUMENTS

| | | |
|---|---|---|
| GB | 2278519 | 11/1994 |
| JP | 10247377 | 9/1998 |

(Continued)

OTHER PUBLICATIONS

Charles S. Carrano, Christopher T. Bridgewood, Keith M. Groves, Impacts of the Dec. 2006 Solar Radio Bursts on GPS Operations, Jan. 20, 2008.

(Continued)

*Primary Examiner* — Edan Orgad
*Assistant Examiner* — Saumit Shah
(74) *Attorney, Agent, or Firm* — Jared L. Cherry; Richard M. Edge

(57) ABSTRACT

The present disclosure relates to systems and methods for detection of a failed communication link and rerouting network traffic around the failure. One embodiment of a system consistent with the present disclosure may comprise a communication subsystem in communication with the data network and configured to transmit information to a recipient. The system may also include a confirmatory signal subsystem configured to generate a confirmatory signal. The confirmatory signal may be inserted into a stream of data to be transmitted to the recipient through a first communication path. Upon detection of a disruption in the confirmatory signal, a failover subsystem configured to reroute the stream of network data to be transmitted to the recipient through a second communication path. The second communication path may comprise one or more physical connections in the network that are distinct from the first communication path.

21 Claims, 5 Drawing Sheets

(56) References Cited

U.S. PATENT DOCUMENTS

| | | | |
|---|---|---|---|
| 4,546,486 A | 10/1985 | Evans | |
| 4,633,421 A | 12/1986 | Watson | |
| 4,768,178 A | 8/1988 | Conklin | |
| 4,808,884 A | 2/1989 | Hull | |
| 5,103,466 A | 4/1992 | Bazes | |
| 5,185,860 A | 2/1993 | Wu | |
| 5,235,590 A | 8/1993 | Taguchi | |
| 5,363,377 A | 11/1994 | Sharpe | |
| 5,680,324 A | 10/1997 | Schweitzer | |
| 5,793,869 A | 8/1998 | Claflin | |
| 5,943,381 A | 8/1999 | Zampetti | |
| 6,115,825 A | 9/2000 | Laforge | |
| 6,236,623 B1 | 5/2001 | Read | |
| 6,356,127 B1 | 3/2002 | Klipper | |
| 6,456,831 B1 | 9/2002 | Tada | |
| 6,567,986 B2 | 5/2003 | Ward | |
| 6,577,628 B1 | 7/2003 | Hejza | |
| 6,678,134 B2 | 1/2004 | Benenson | |
| 6,754,210 B1 | 6/2004 | Ofek | |
| 6,847,691 B2 | 1/2005 | Torikoshi | |
| 6,859,742 B2 | 2/2005 | Randall | |
| 6,891,441 B2 | 5/2005 | Rochow | |
| 6,937,683 B1 | 8/2005 | Ratzel | |
| 6,947,269 B2 | 9/2005 | Lee | |
| 7,043,541 B1 | 5/2006 | Bechtolscheim | |
| 7,085,938 B1 | 8/2006 | Pozzuoli | |
| 7,187,709 B1 | 3/2007 | Menon | |
| 7,239,581 B2 | 7/2007 | Delgado | |
| 7,272,201 B2 | 9/2007 | Whitehead | |
| 7,283,568 B2 | 10/2007 | Robie | |
| 7,360,954 B1 | 4/2008 | Seaver | |
| 7,398,411 B2 | 7/2008 | Zweigle | |
| 7,463,467 B2 | 12/2008 | Lee | |
| 7,480,580 B2 | 1/2009 | Zweigle | |
| 7,610,175 B2 | 10/2009 | Eidson | |
| 7,617,408 B2 | 11/2009 | Frazier | |
| 7,630,863 B2 | 12/2009 | Zweigle | |
| 7,701,683 B2 | 4/2010 | Morris | |
| 7,821,876 B2 | 10/2010 | Frantz | |
| 7,899,619 B2 | 3/2011 | Petras | |
| 8,009,519 B2 | 8/2011 | Jazra | |
| 9,178,807 B1 * | 11/2015 | Chua | H04L 45/02 |
| 2001/0023464 A1 | 9/2001 | Deck | |
| 2002/0069299 A1 | 6/2002 | Rosener | |
| 2002/0156920 A1 | 10/2002 | Conrad | |
| 2003/0046427 A1 | 3/2003 | Goringe | |
| 2003/0063560 A1 * | 4/2003 | Jenq | H04L 45/00 370/216 |
| 2004/0025010 A1 | 2/2004 | Azema | |
| 2004/0071389 A1 | 4/2004 | Hofmeister | |
| 2004/0105341 A1 | 6/2004 | Chamberlain | |
| 2004/0131014 A1 | 7/2004 | Thompson | |
| 2005/0049976 A1 | 3/2005 | Yang | |
| 2005/0054301 A1 * | 3/2005 | Brown | H04N 17/00 455/67.14 |
| 2005/0069025 A1 | 3/2005 | Kimura | |
| 2005/0240775 A1 | 10/2005 | Chan | |
| 2005/0265717 A1 | 12/2005 | Zhou | |
| 2006/0025018 A1 | 2/2006 | Dube | |
| 2006/0126495 A1 * | 6/2006 | Guichard | H04L 12/2697 370/216 |
| 2006/0277346 A1 | 12/2006 | Doak | |
| 2006/0280182 A1 | 12/2006 | Williams | |
| 2007/0030841 A1 | 2/2007 | Lee | |
| 2007/0147415 A1 | 6/2007 | Marusca | |
| 2007/0258715 A1 | 11/2007 | Androni | |
| 2007/0294496 A1 | 12/2007 | Goss | |
| 2007/0300094 A1 | 12/2007 | Frazier | |
| 2008/0049550 A1 | 2/2008 | Fleure | |
| 2008/0071482 A1 | 3/2008 | Zweigle | |
| 2008/0097694 A1 | 4/2008 | Petras | |
| 2008/0104584 A1 | 5/2008 | Murata | |
| 2008/0109822 A1 | 5/2008 | Chokshi | |
| 2008/0189784 A1 | 8/2008 | Mangione-Smith | |
| 2008/0219186 A1 | 9/2008 | Bell | |
| 2008/0235355 A1 | 9/2008 | Spanier | |
| 2009/0070447 A1 | 3/2009 | Jubinville | |
| 2009/0088990 A1 | 4/2009 | Schweitzer | |
| 2009/0141727 A1 | 6/2009 | Brown | |
| 2009/0160189 A1 | 6/2009 | Rasmussen | |
| 2009/0172455 A1 | 7/2009 | Pind | |
| 2009/0180477 A1 | 7/2009 | Akahane | |
| 2009/0216910 A1 | 8/2009 | Duchesneau | |
| 2009/0228982 A1 | 9/2009 | Kobayashi | |
| 2009/0327724 A1 * | 12/2009 | Shah | H04L 9/3271 713/169 |
| 2010/0195763 A1 | 8/2010 | Lee | |
| 2011/0022734 A1 | 1/2011 | Etheridge | |
| 2011/0135047 A1 | 6/2011 | Tournier | |
| 2011/0185214 A1 | 7/2011 | Luskind | |
| 2014/0355447 A1 * | 12/2014 | Gohite | H04W 40/34 370/236 |

FOREIGN PATENT DOCUMENTS

| | | |
|---|---|---|
| JP | 2001221871 | 8/2001 |
| JP | 2001221874 | 8/2001 |
| WO | 16525 | 3/2000 |
| WO | 57527 | 9/2000 |

OTHER PUBLICATIONS

D. Mills, Simple Network Time Protocol (SNTP) Version 4 for IPv4, IPv6, and OSI, Network Working Group Request for Comments 4330, Jan. 2006.

D.L. Mills, Experiments in Network Clock Synchronization, Network Working Group Request for Comments: 957, Sep. 1985.

Lv, Shuai et al. "An Enhanced IEEE 1588 Time Synchronization for Asymmetric Communication Link in Packet Transport Network," IEEE Communications Letters, vol. 14, No. 8, Aug. 2010. pp. 764-766.

David T. Stott, Avaya Labs Research, Avaya Inc., Layer-2 Path Discovery Using Spanning Tree MIBs, Mar. 7, 2002.

D. Levi, J. Schoenwaelder, Tu Braunschweig, RFC 3165—Definitions of Managed Objects for the Delegation of Management Scripts, <http://tools.ietf.org/html/rfc3165#section-7.1> Aug. 2001.

Adtran, ATLAS 830, Integrated Access Device, Sep. 2003.

A. Bierman, K Jones, RFC2922—Physical Topology MIB, <http://www.faqs/org/rfcs/rfc2922.html>, Sep. 2000.

Suman Pandey, Mu-Jung Choi, Sung-Joo Lee, James W. Hong, IP Network Topology Discovery Using SNMP, Science and Engineering, POSTECH, Korea, Jan. 20, 2009.

Kenneth C. Behrendt, Michael J. Dood, Substation Relay Data and Communication, Oct. 1995.

E.O Schweitzer III, Gary W. Scheer, David Dolezilek, Comparison of SEL-2020 Star Network to Shared Networks, Nov. 1999.

Douglas Proudfoot, Dave Taylor, How to Turn a Substation into a Database Server, Apr. 1999.

* cited by examiner

COMMUNICATION LINK MONITORING AND FAILOVER

TECHNICAL FIELD

This disclosure relates to systems and methods for detection of a failed communication link and rerouting network traffic around the failure. More particularly, but not exclusively, this disclosure relates to implementing a confirmatory signal configured to confirm satisfactory operation of the network and rerouting network traffic to an alternate communication path if the confirmatory signal is not received or fails to satisfy established thresholds.

BRIEF DESCRIPTION OF THE DRAWINGS

Non-limiting and non-exhaustive embodiments of the disclosure are described, including various embodiments of the disclosure with reference to the figures included in the detailed description.

DETAILED DESCRIPTION

Figure 1:
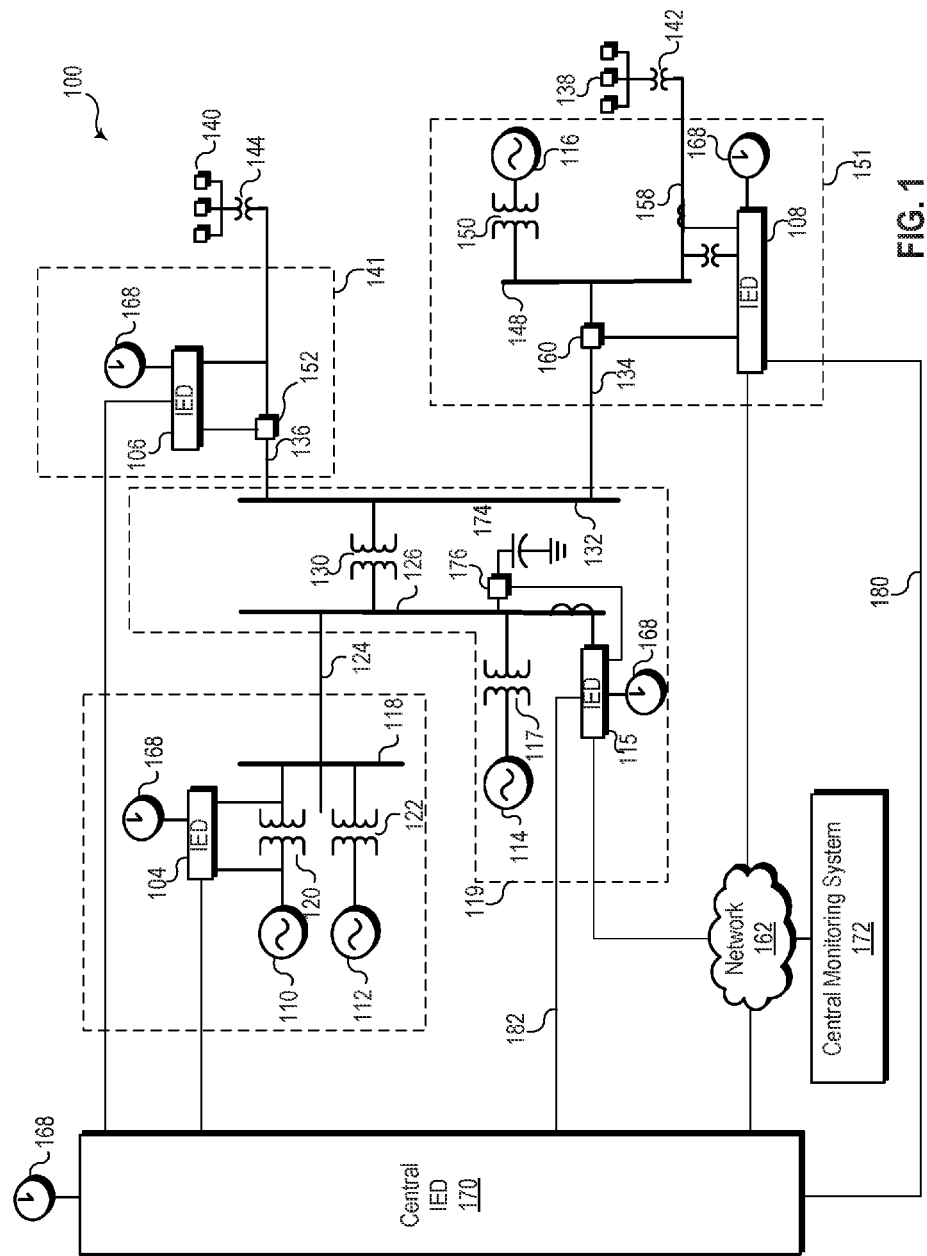
FIG. 1 illustrates a simplified one-line diagram of an electric power transmission and distribution system configured to utilize a communication network consistent with embodiments of the present disclosure.

The present disclosure pertains to systems and methods for monitoring a communication in a data communication network and rerouting data around a failed communication link. In some embodiments, one or more devices may be configured to transmit or receive a confirmatory signal within a stream of data transmitted through the data communication network. The confirmatory signal may be transmitted according to a schedule, and accordingly, failure to receive an expected message may provide an indication of a failure of a communication link.

In various embodiments, the parameters of the confirmatory signal may be configured based on various factors. Variable parameters of the confirmatory signal may include the frequency of the message, the acceptable variation in the latency of the delivery of the confirmatory signal, the reliability of the transmission, etc. These parameters may be selected based on the data transmitted through the data communication network, such as the time-sensitivity of the data, and the available bandwidth in the communication network. In some embodiments in which time-sensitive data is transmitted through a communication channel, the confirmatory signal may be transmitted more frequently than embodiments with less time sensitivity.

In one embodiment, a relay configured to monitor an electric power distribution system may be configured to send a confirmatory signal along with data related to the electric power distribution system through a first communication channel to a client device. If the client device does not receive the confirmatory signal on an expected schedule, the client device may be configured to cause the data to be rerouted to a redundant communication path. In one specific embodiment, the client device may be connected to the relay through a contact output. In such embodiments, the client device may communicate the failure to receive the confirmatory signal to the relay by asserting the contact output. The assertion of the contact output may cause the relay to failover to the redundant communication path. In other embodiments, the transition to the failover path may be accomplished using other techniques. In one embodiment involving a software-defined network ("SDN") the client device may communicate the failure to an SDN controller, and the SDN controller may reroute the data traffic over through the network to avoid the failed communication link.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an alternating current electric power transmission and distribution system 100 consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

In various embodiments, IEDs 104, 106, 108, 115, and 170 may be configured to monitor the frequency of alternating current waveforms in system 100. The measurements may be used in connection with the systems and methods disclosed herein for control of system 100. The IEDs may utilize common time source 168 to time-align measurements for comparison across system 100.

Network 162 may be used to transmit information among various components in system 100, including IEDs 108, 115, 170, and central monitoring system 172. In order to increase reliability, network 162 may include redundant communication paths between communicating devices. Such redundant paths may be selectively enabled when a first communication path is unavailable or disabled. In various embodiments consistent with the present disclosure, a communication link may be monitored and a redundant communication may be activated in the event that the first communication path fails. Network 162 may include a variety of devices (e.g., multiplexers, routers, hubs, gate-ways, firewalls, switches, etc.) and technologies (e.g., connectionless communication network, SDN networks, etc.)

Measurements made by IEDs 104, 106, 108, and 115 may be communicated to central IED 170 and/or central monitoring system 172. In some embodiments, one or more of IEDs 108 and 115 may be configured to send a confirmatory signal through network 162 to central IED 170. If central IED 170 does not receive the confirmatory signal on an expected schedule, central IED 170 may be configured to cause the data to be rerouted to a redundant communication path. In the illustrated embodiment, central IED 170 is in contact with IEDs 108 and 115 via analog contact channels 180 and 182, respectively. The contact channels 180 and 182 may be selectively asserted in the event that the confirmatory signals are not received on an expected schedule. The assertion of the contact channel may cause the relay to failover to the redundant communication path. In other embodiments, the transition to the failover path may be accomplished using other techniques. In one embodiment involving a software-defined network ("SDN") the client device may communicate the failure to an SDN controller, and the SDN controller may reroute the data traffic over through the network to avoid the failed communication link.

Figure 2A:
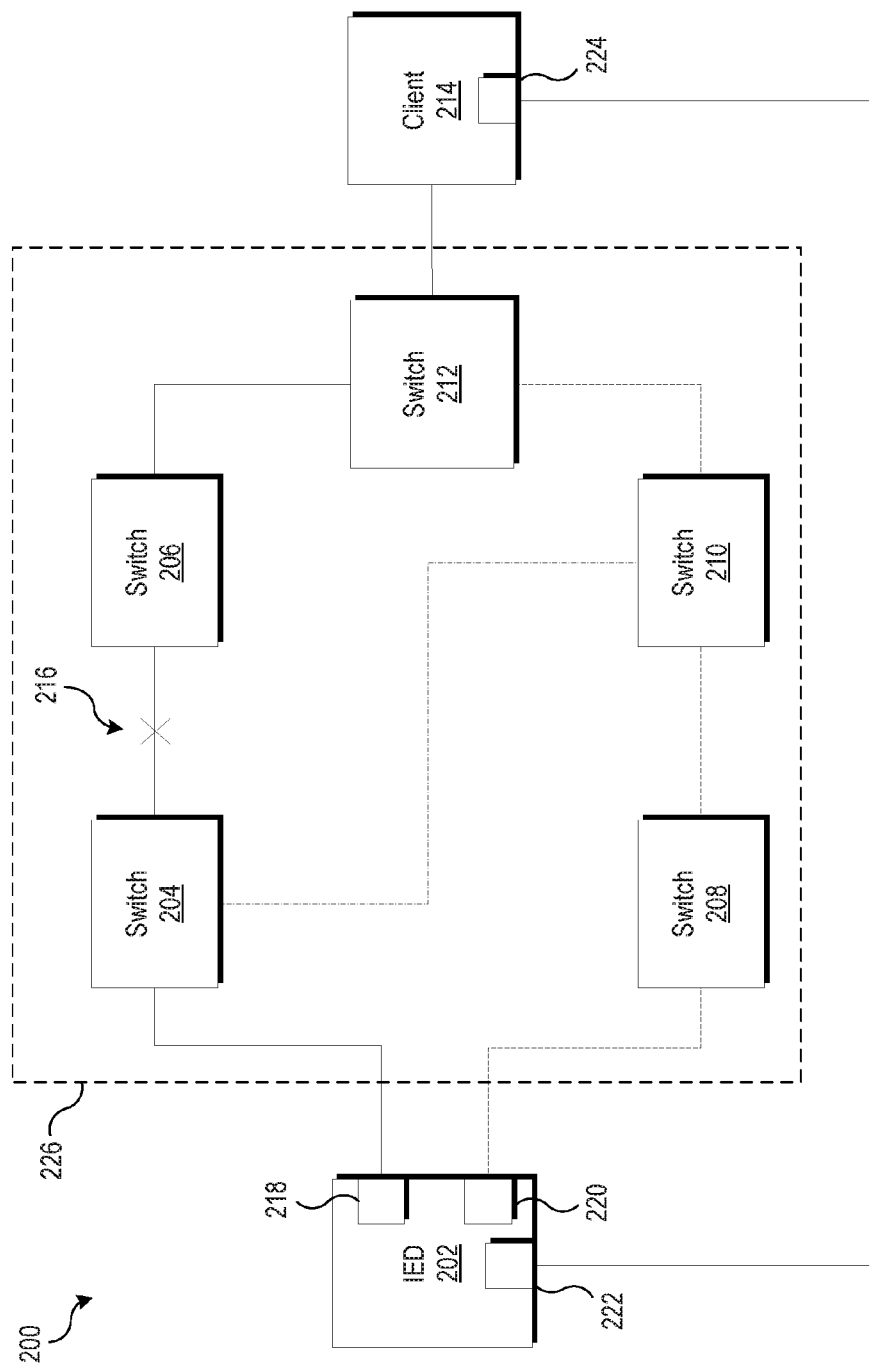
FIG. 2A illustrates a block diagram of a system configured to utilize a confirmatory signal to detect a failure of a communication link within a data network and to reroute network traffic in response to the network failure consistent with embodiments of the present disclosure.

FIG. 2A illustrates a block diagram of a system 200 configured to utilize a confirmatory signal to detect a failure of a communication link 216 within a data network 226 and to reroute network traffic in response to the failure consistent with embodiments of the present disclosure. An IED 202 may be configured to receive information from a client 214 via data network 226. In various embodiments, the information may pertain to the status or operation of an electric power system. Such information may include measurements of an electrical signal (e.g., representations of voltage, current, frequency, phase, etc.), or may represent status information of monitored equipment within the electric power system.

Network 226 includes a plurality of switches 204-212 that create a first data path, which is shown in solid lines, through switches 204 and 206. Network 226 also creates a second data path, which is shown in dashed lines, through switches 208 and 210. In the illustrated embodiment, the first data path may be referred to as a first or primary data path, while the second data path may be referred to as a secondary or redundant data path. In other embodiments, the first and second paths may be reversed. IED 202 includes a first communication port 218 in communication with switch 204 and a second communication port 220 in communication with switch 208. IED 202 may be configured to communicate via first communication port 218 when the first data path is available. When the first data path is unavailable, IED 202 may failover to second communication port 220.

As illustrated in FIG. 2, the failure 216 in the first communication path is not associated with a physical link connected to either IED 202 or client 214. Rather, the failure 216 is located between switches 204 and 206. The failure of an intermediate link, such as the connection between switches 204 and 206, may be difficult for IED 202 or client 214 to detect; however, use of a confirmatory signal consistent with the present disclosure may overcome this difficulty.

In the illustrated embodiment, the first data path (shown in solid lines) is entirely distinct from the second data path (shown in dashed lines). In other words, none of the same physical connections through network 226 are shared by the first data path and the second data path. Accordingly, failure of a physical segment of network 226 utilized by the first data path (i.e., the link between switch 204 and switch 206) does not affect the transmission of data via the second data path. While the embodiment illustrated in FIG. 2 shows that the first data path and the second data path utilize entirely distinct physical connections in the network, in other embodiments, the first data path and the second data path may share certain physical segments of the network. For example, an alternative embodiment may include a connection between switch 204 and switch 210, which is shown with a dash-dot pattern. In this example, an alternative communication path that avoids failure 216 may be generated by transmitting data via the connection between switch 204 and switch 210.

A confirmatory signal may be transmitted between IED 202 and client 214 to confirm the continuing operation of the first data path. In some embodiments, IED 202 may be configured to transmit the confirmatory signal, which is received by client 214. If the confirmatory signal is not received for a specified period of time, it may be concluded that there is a failure 216 in the first data path, and data traffic may be rerouted to the second data path. The failure may be communicated by client 214 through a contact interface 224, which is in communication with a contact interface 222 of IED 202. The contact interface 224 and contact interface 222 may be configured to assert and/or detect an analog signal. A change in the analog signal may provide an indication that IED 202 should transition from communication via the first data path to communication via the second data path or vice versa. In other embodiments, client 214 may be configured to transmit the confirmatory signal, which is received by IED 202. In still other embodiments, the confirmatory signal may be transmitted by both IED 202 and client 214.

Figure 2B:
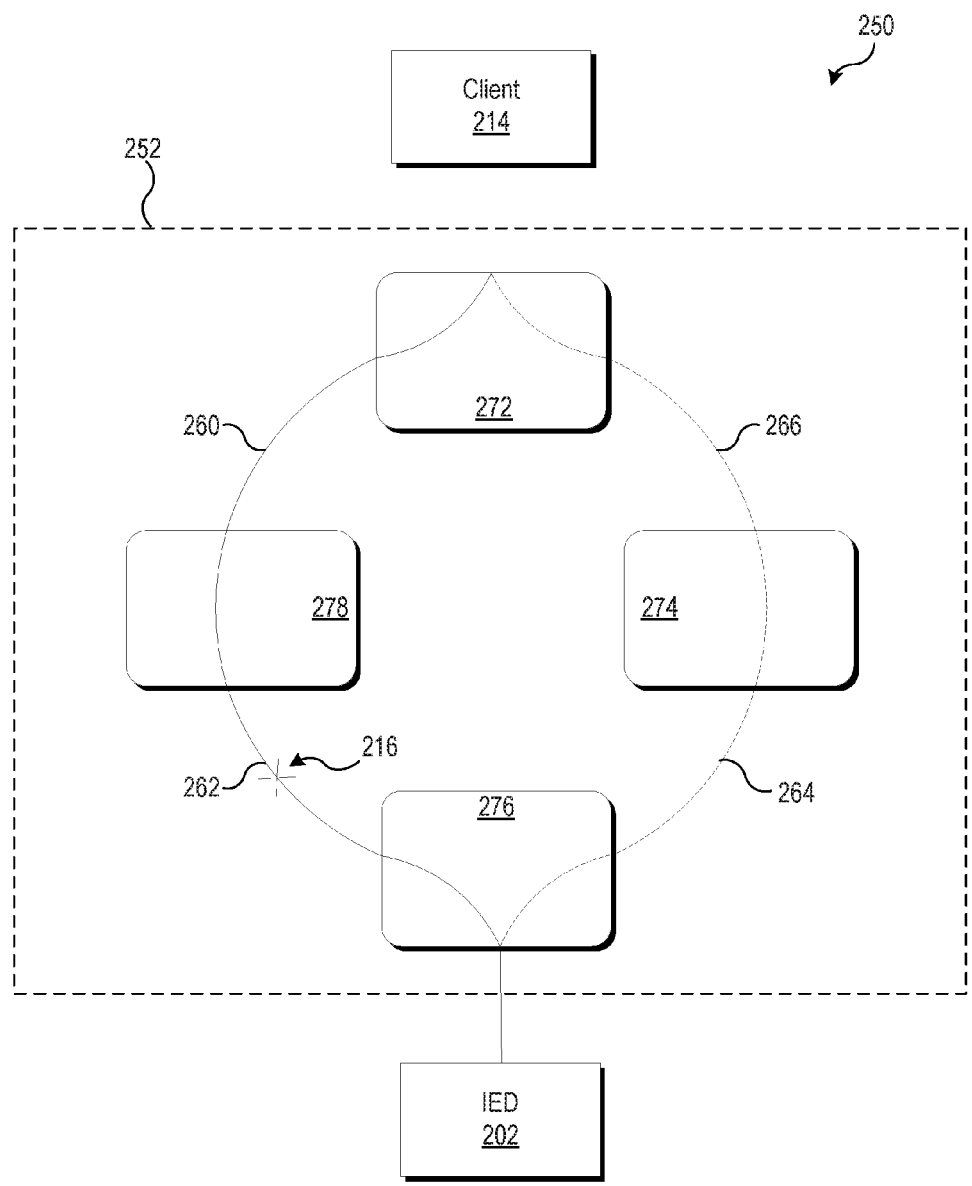
FIG. 2B illustrates a block diagram of a system including a network with a ring topology configured to utilize a confirmatory signal to detect a network failure and to reroute network traffic in response to the network failure consistent with embodiments of the present disclosure.

FIG. 2B illustrates a block diagram of a system 250 including a data network 252 with a ring topology configured to utilize a confirmatory signal to detect a network failure and to reroute network traffic in response to the network failure consistent with embodiments of the present disclosure. According to the illustrated embodiment, communications links 260-266 form a ring architecture. IED 202 may be configured to receive information from a client 214 via data network 252. In various embodiments, the information may pertain to the status or operation of an electric power system. Such information may include measurements of an electrical signal (e.g., representations of voltage, current, frequency, phase, etc.), or may represent status information of equipment within the electric power system.

Network 252 forms a first data path, which is shown in solid lines through nodes 272, 278, and 276. A second data path, which is shown in dashed lines, may be formed through nodes 272, 274, and 276. In other embodiments, the first and second paths may be reversed. If one of the communication links becomes damaged or unavailable, the ring architecture may ensure that all nodes within the network maintain communication.

A confirmatory signal may be transmitted between IED 202 and client 214 to confirm the continuing operation of the first data path. In some embodiments, IED 202 may be configured to transmit the confirmatory signal, which is received by client 214. If the confirmatory signal is not received for a specified period of time, it may be concluded that there is a failure 216 in the first data path, and data traffic may be rerouted to the second data path. In other embodiments, client 214 may be configured to transmit the confirmatory signal, which is received by IED 202. In still other embodiments, the confirmatory signal may be transmitted by both IED 202 and client 214.

Figure 3:
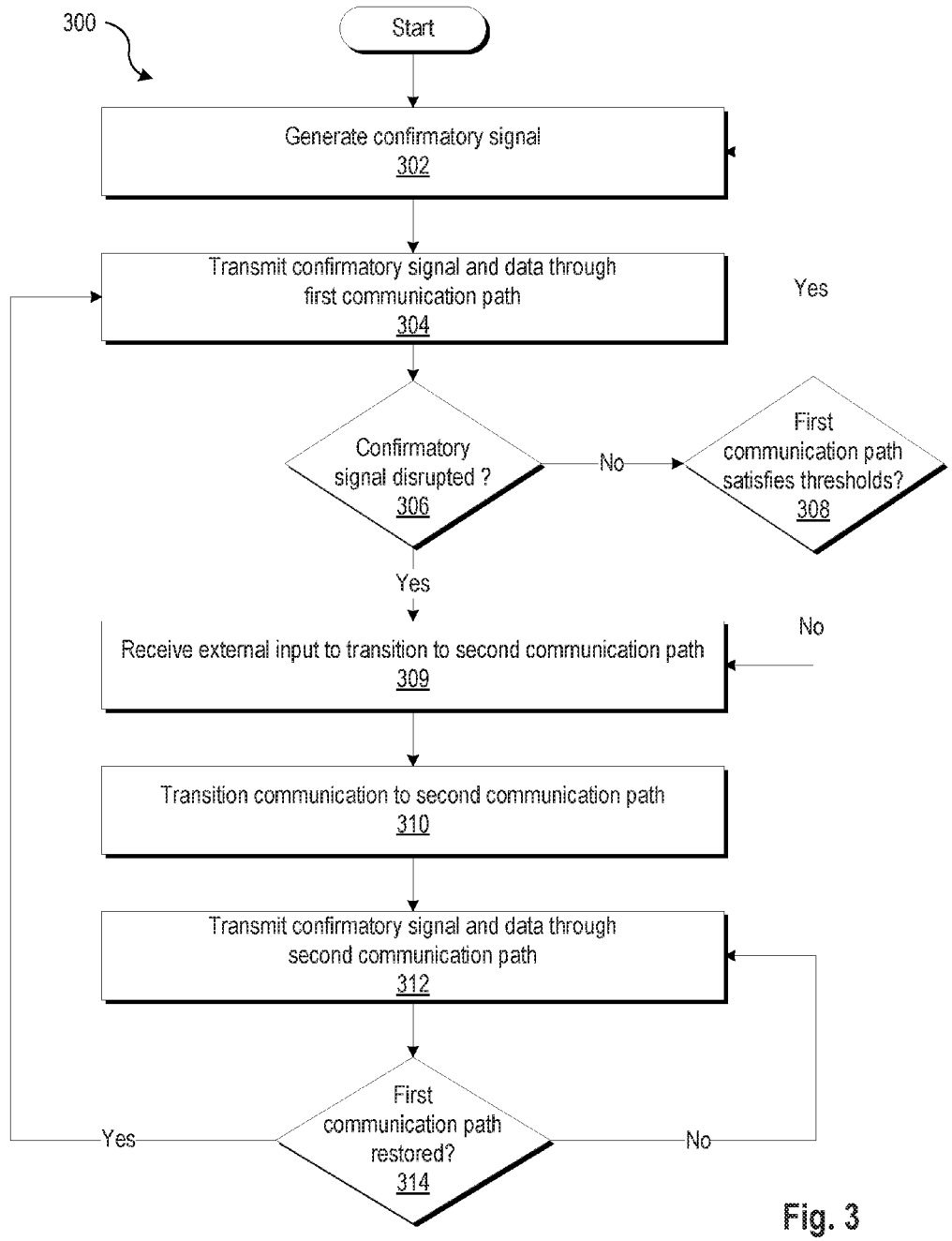
FIG. 3 illustrates a flow chart of a method for detecting a failed communication link and rerouting network traffic around the failure consistent with embodiments of the present disclosure.

FIG. 3 illustrates a flow chart of a method 300 for detecting a failed communication link and rerouting network traffic around the failure consistent with embodiments of the present disclosure. At 302, a confirmatory signal may be generated. The confirmatory signal may be embodied in a variety of ways. In some embodiments, the confirmatory signal may be transmitted according to a schedule known to the receiving device. Accordingly, failure to receive a packet according to the schedule may be indicative of a disruption in a communication path between the transmitting and the receiving device. In other embodiments, the confirmatory signal may comprise an acknowledgement confirming receipt of a message. For example, a transmitting device may send information to a receiving device, and upon receipt of the information, the receiving device may transmit an acknowledgement. Accordingly, failure to receive the acknowledgement may be indicative of a disruption in a communication path between the transmitting and the receiving device.

At 304, the confirmatory signal and data may be transmitted through a first communication path. The first communication path may comprise any route through a network between two communicating devices. The route may be a static route, or may be a dynamic route that changes based on conditions in the network. The first communication path simply refers to a route through which information may traverse a network between the two devices.

At 306, method 300 may determine whether the confirmatory signal has been disrupted. The mechanism for determining whether the information has been received may vary depending on the confirmatory signal utilized in a particular embodiment. For example, in an embodiment in which the confirmatory signal is transmitted at a regular interval, a failure to receive the confirmatory signal according to the schedule may result in a determination that the confirmatory signal was not received. In another example in which the confirmatory signal comprises acknowledgement of receipt by a recipient, a determination that the confirmatory signal was not received may be based on failure to receive the acknowledgement within a specified time window following transmission of the original message. If the confirmatory signal is received, method 300 may proceed to 308.

At 308, method 300 may determine whether the first communication path signal satisfies specified thresholds. In various embodiments, the thresholds may be selected to assess the operation of the first communication channel. For example, in one embodiment, a threshold evaluated at 308 may comprise packet latency. In other embodiments, the threshold may comprise a bit rate error, a signal-to-noise ratio, a packet loss rate, total travel time, or other characteristics. Still further, in embodiments in which the first communication path comprises a fiber optic communication channel, the thresholds may further comprise measurements of various optical parameters, such as reflection characteristics, attenuation characteristics, harmonic characteristics, etc.

At 310, a system implementing method 300 may transition to a second communication path based on disruption of the confirmatory signal at 306 or failure to satisfy the thresholds at 308. The second communication path may comprise any route, other than the first communication path through a network between two communicating devices. The route may be a static route or may vary based on conditions in the network.

At 309, an external input may be received that is configured to cause a transition to the second communication path. In some embodiments, the external input may be provided to the device that generates the confirmatory signal. The external input may comprise a contact interface in some embodiments, such as contact interface 222 in FIG. 2A. In other embodiments, other interfaces may be used to communicate the external input configured to cause a transition to the second communication path.

At 312, the confirmatory signal and data may be transmitted via the second communication path. The confirmatory signal used to verify satisfactory operation of the first communication path may also be used to verify satisfactory operation of the second communication path.

At 314, method 300 may determine if the first communication path has been restored. The determination may be accomplished in various ways. In some embodiments a system implementing method 300 may continue to transmit the confirmatory signal via the first communication path. Upon receipt of the confirmatory signal via the first communication path, use of the first communication path may be resumed at 304. Until the first communication path is restored, method 300 may continue to use the second communication path.

Figure 4:
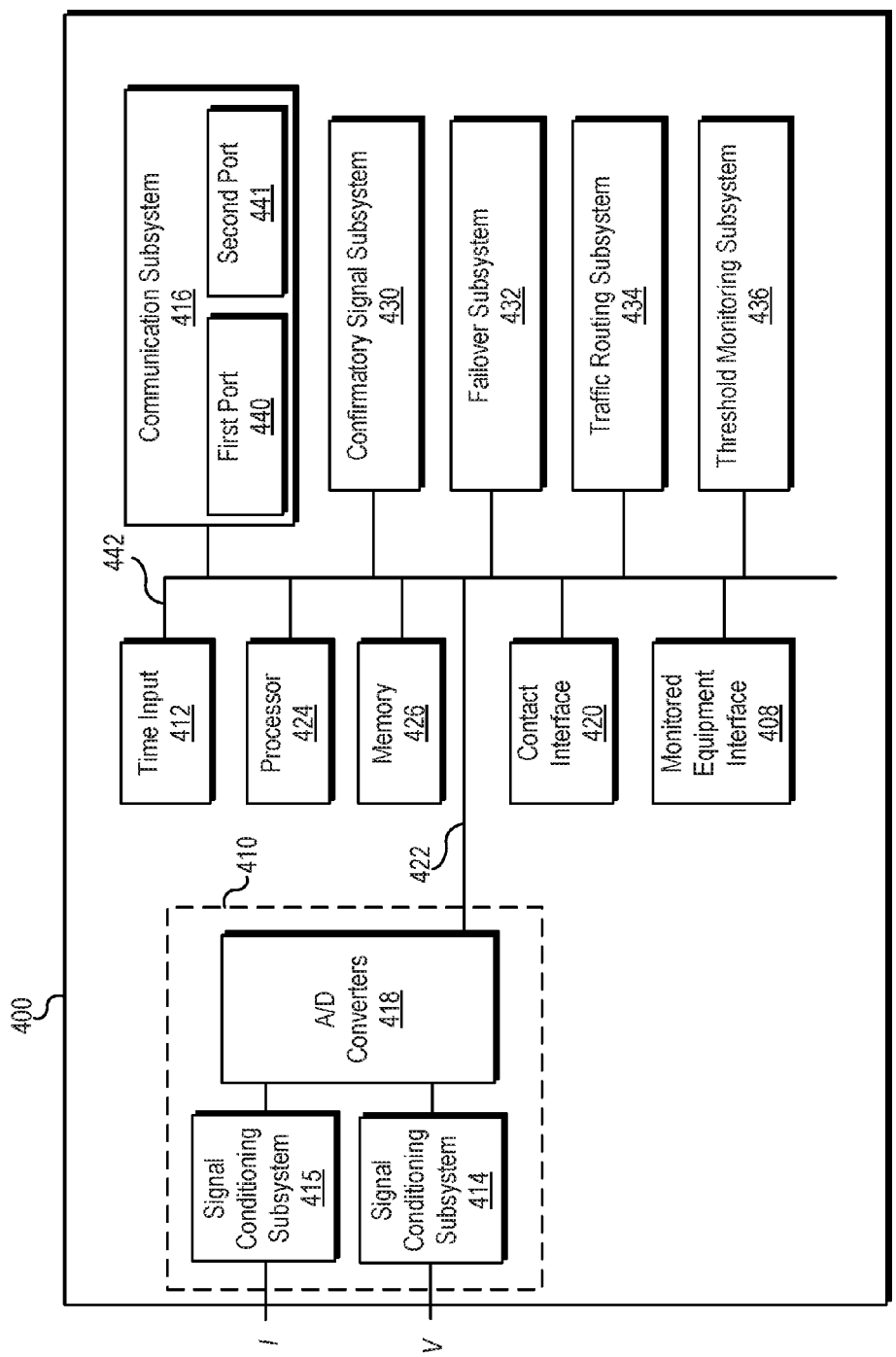
FIG. 4 illustrates a block diagram of a system configured to detect a failed communication link and to reroute network traffic around the failure consistent with embodiments of the present disclosure.

FIG. 4 illustrates a block diagram of a system 400 configured to detect a failed communication link and to reroute network traffic around the failure consistent with embodiments of the present disclosure. In some embodiments, system 400 may be implemented using hardware, software, firmware, and/or any combination thereof. Moreover, certain components or functions described herein may be associated with other devices or performed by other devices. The specifically illustrated configuration is merely representative of one embodiment consistent with the present disclosure. A data bus 442 may facilitate communication among various components of system 400.

System 400 includes a communications subsystem 416 configured to communicate with other devices via a network (not shown). Communications subsystem 416 may facilitate communications with multiple devices. In the illustrated embodiment, communication subsystem 416 includes a first port 440 and a second port 441. The first port 440 and the second port 441 may, in some embodiments, be in communication with a first communication path and a second communication path. In some embodiments, the first port 440 is used when system 400 communicates via the first communication path, while the second port 441 is used when system 400 communicates via the second communication path. Still further, multiple communication ports in communication subsystem 416 may enable system 400 to operate in a network having a ring architecture.

System 400 may further include a time subsystem 412, which may be used to receive a time signal (e.g., a common time reference) allowing system 400 to associate data with a time-stamp received from time system 412. In certain embodiments, a common time signal may be received via communications subsystem 416. One such embodiment may employ the IEEE 1588 protocol.

Processor 424 may be configured to process communications received via communications subsystem 416, time subsystem 412, and to coordinate the operation of the other components of system 400. Processor 424 may operate using any number of processing rates and architectures. Processor 424 may be configured to perform any of the various algorithms and calculations described herein. Processor 424 may be embodied as a general purpose integrated circuit, an application specific integrated circuit, a field-programmable gate array, and/or any other suitable programmable logic device. Instructions to be executed by processor 424 may be stored in random access memory 426 (RAM).

A monitored equipment interface 408 may be configured to receive status information from, and issue control instructions to, a piece of monitored equipment (such as a circuit breaker, recloser, etc.). In various embodiments monitored equipment interface 408 may be in communication with one or more breakers or re-closers that may selectively connect or disconnect an electrical load. The monitored interface may be used in various embodiments to implement control instructions based on the frequency of a monitored waveform.

System 400 may further include a contact interface 420. Contact interface 420 may comprise digital inputs/outputs and/or analog inputs/outputs. Contact interface 420 may permit direct communication with other devices. In some embodiments, system 400 may be configured to transition from communicating via a first communication path to communicating via a second communication path based on a signal received via contact interface 420. In one specific embodiment, a client device may be in communication with system 400 via the contact interface. If the client device does not receive a confirmatory signal from system 400 on an expected schedule, the client device may communicate its failure to receive the confirmatory signal to system 400 by asserting a signal received by contact interface 420.

In certain embodiments, system 400 may include a sensor component 410. In the illustrated embodiment, sensor component 410 is configured to gather data directly from equipment such as a conductor in an electric power distribution system. The sensor component 410 may include signal conditioning subsystems 414, 415 that are configured to condition the signal for use by system 400. In some embodiments, the signal conditioning subsystems 414, 415 may include transformers configured to step down a voltage or current to a suitable level for use by system 400 or filters configured to limit the bandwidth of signals. Sensor component 410 may further include A/D converters 418 that may sample and/or digitize conditioned waveforms to form corresponding digitized signals. The digitized signals may be provided to data bus 442 and accessed by other components of system 400. In various embodiments, system 400 may be configured to interpolate the digitized signals created by sensor component 410.

A confirmatory signal subsystem 430 may be configured to generate and/or monitor a confirmatory signal used to verify the operation of one or more communication channels. In various embodiments, confirmatory signal subsystem 430 may be configured to generate a variety of types of confirmatory signals. For example, confirmatory signal subsystem 430 may be configured to: transmit or receive a confirmatory signal according to a fixed schedule, to transmit or receive an acknowledgement, etc. If the confirmatory signal is disrupted, system 400 may be configured to reroute data traffic to a second communication path.

A failover subsystem 432 may be configured to cause system 400 to failover to a second communication path based on a disruption of the confirmatory signal. In one specific embodiment, the failover subsystem 432 may be configured to transition communications from the first port 440 to the second port 441 in response to a disruption of the confirmatory signal. In alternative embodiments, the transition to a second communication path may be accomplished by rerouting communications through a network while continuing to use the same communication port (e.g., first port 440 or second port 441).

A traffic routing subsystem 434 may be configured to reroute traffic through a network based on a disruption of the confirmatory signal. In some embodiments traffic routing subsystem 434 may specify a first communication path and a second communication path, each of which comprise a static route through a network. In other embodiments, a first communication path and a second communication path may comprise dynamic routes that are determined based on conditions in the network. In embodiments in which the communication paths are dynamically generated, traffic routing subsystem 434 may be configured to generate one or more redundant communication paths through the network based on various network conditions, such as available bandwidth, latency, total travel time, etc.

A threshold monitoring subsystem 436 may be configured to monitor one or more communication paths to determine whether communications transmitted through a monitored communication path satisfies specified thresholds. In various embodiments, the thresholds may represent packet latency, a bit rate error, a signal-to-noise ratio, a packet loss rate, total travel time, or other characteristics. Still further, in embodiments in which the first communication path comprises a fiber optic communication channel, the thresholds may further comprise measurements of various optical parameters, such as reflection characteristics, attenuation characteristics, harmonic characteristics, etc. In the event that a communications transmitted through a monitored communication path fail to satisfy the specified thresholds, system 400 may be configured to transition to a second communication path.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) configured to operate in an electric power system and to monitor a first communication path in a data network, comprising:
   a communication subsystem in communication with the data network and configured to transmit information to a recipient;
   a confirmatory signal subsystem configured:
      to generate a confirmatory signal;
      to insert the confirmatory signal into a continuous stream of data to be transmitted to the recipient through a first communication path in the data network; and
      to detect a disruption in the confirmatory signal;
   a failover subsystem configured to reroute the stream of network data to be transmitted to the recipient through a second communication path in response to the disruption;
   wherein the second communication path comprises at least one physical connection in the network that is distinct from the first communication path; and
   wherein the first communication path is established and continuously operating prior to the disruption.

2. The IED of claim 1, wherein the confirmatory signal comprises a transmission inserted into the data stream according to an established schedule.

3. The IED of claim 1, wherein the confirmatory signal subsystem is further configured to receive an acknowledgement from the recipient.

4. The IED system of claim 3, wherein the disruption comprises a failure to receive the acknowledgement.

5. The IED of claim 1, wherein the communication interface comprises a first communication port in communication with the first communication path and a second communication port in communication with the second communication path.

6. The IED of claim 5, wherein the first communication port and the second communication port are each in communication with a distinct segment of the network, and the network comprises a ring architecture.

7. The IED of claim 1, further comprising a traffic routing subsystem configured to dynamically establish the second communication path based on conditions in the network.

8. The IED of claim 1, further comprising:
a threshold monitoring subsystem configured to compare the stream of network data transmitted via the first communication path to at least one threshold;
wherein the failover subsystem is further configured to reroute the stream of network data to be transmitted to the recipient through the second communication when the data transmitted via the first communication path falls below the least one threshold.

9. The IED of claim 1, wherein each physical connection comprised by the first communication path is distinct from each physical connection comprised by the second communication path.

10. The IED of claim 1, wherein the confirmatory signal provides confirmation of continuing operation of the first communication path.

11. A method for monitoring a first communication path in a data network using an intelligent electronic device (IED) in an electric power system, comprising:
generating a confirmatory signal using the IED;
inserting the confirmatory signal into a continuous stream of data to be transmitted to a recipient via the first communication path using the IED;
transmitting the confirmatory signal and the stream of network data via the first communication path using the IED;
detecting a disruption in the confirmatory signal using the IED; and
rerouting the stream of network data to be transmitted to the recipient through a second communication path in response to the disruption using the IED, the second communication path comprising at least one physical connection in the network that is distinct from the first communication path;
wherein the first communication path is established and continuously operating prior to the disruption.

12. The method of claim 11, wherein detecting the disruption comprises receiving a signal from the recipient via an analog contact interface.

13. The method of claim 11, wherein detecting the disruption comprises failing to receive the confirmatory signal according to an established schedule.

14. The method of claim 11, further comprising receiving an acknowledgement from the recipient.

15. The method of claim 14, wherein detecting the disruption comprises failing to receive the acknowledgement.

16. The method of claim 11, further comprising:
using a first communication port to communicate via the first communication path; and
using a second communication port to communicate via the second communication path.

17. The method of claim 16, wherein the first communication port and the second communication port each communicate with a distinct segment of the network, and the network comprises a ring architecture.

18. The method of claim 11, further comprising dynamically establishing the second communication path based on conditions in the network.

19. The method of claim 11, further comprising:
determining that the stream of network data transmitted via the first communication path fails to satisfy at least one threshold; and
rerouting the stream of network data through the second communication path.

20. The method of claim 11, wherein each physical connection comprised by the first communication path is distinct from each physical connection comprised by the second communication path.

21. An intelligent electronic device (IED) configured to operate in an electric power system and to monitor a first communication path in a data network, comprising:
a communication subsystem in communication with the data network and configured to transmit information to a recipient;
a confirmatory signal subsystem configured:
to generate a confirmatory signal;
to insert the confirmatory signal into a stream of data to be transmitted to the recipient through a first communication path in the data network; and
to detect a disruption in the confirmatory signal;
a failover subsystem configured to reroute the stream of network data to be transmitted to the recipient through a second communication path in response to the disruption;
an analog contact interface configured to receive an analog signal from the recipient via the analog contact interface;
wherein the analog signal comprises a representation of the disruption.

* * * * *